United States Patent
Shirai

(10) Patent No.: US 9,890,854 B2
(45) Date of Patent: Feb. 13, 2018

(54) VEHICULAR SHIFT OPERATION APPARATUS

(71) Applicant: VOLVO TRUCK CORPORATION, Gothenburg (SE)

(72) Inventor: Masafumi Shirai, Ageo (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 305 days.

(21) Appl. No.: 14/743,951

(22) Filed: Jun. 18, 2015

(65) Prior Publication Data

US 2015/0285372 A1 Oct. 8, 2015

Related U.S. Application Data

(63) Continuation of application No. PCT/JP2013/081613, filed on Nov. 25, 2013.

(30) Foreign Application Priority Data

Dec. 19, 2012 (JP) ................. 2012-276579

(51) Int. Cl.
*B60W 10/02* (2006.01)
*B60W 10/11* (2012.01)
(Continued)

(52) U.S. Cl.
CPC ............. *F16H 61/18* (2013.01); *B60K 23/00* (2013.01); *B60W 30/1884* (2013.01);
(Continued)

(58) Field of Classification Search
None
See application file for complete search history.

(56) References Cited

U.S. PATENT DOCUMENTS 5,706,197 A 1/1998 Stasik et al.
2008/0255738 A1* 10/2008 Murayama ............ B60W 30/19
701/54
(Continued)

FOREIGN PATENT DOCUMENTS

CN 1154924 A 7/1997
EP 1564446 A2 8/2005
(Continued)

OTHER PUBLICATIONS

Japanese Office Action dated May 10, 2016, which issued in Japanese Patent Application No. 2014-553041, together with a partial English language translation thereof.
(Continued)

*Primary Examiner* — Edwin A Young
(74) *Attorney, Agent, or Firm* — McDermott Will & Emery LLP

(57) ABSTRACT

A vehicular shift operation apparatus that includes a manual transmission including an input-side sub-transmission and an output-side sub-transmission, and that is capable of preventing overrun or underrun due to erroneous shift operation, is provided. The vehicular shift operation apparatus includes a manual transmission including an input-side sub-transmission and an output-side sub-transmission, and includes: a main shaft rotation speed sensor that detects a main shaft rotation speed, a sensor that detects a position of a clutch pedal, and a controller. The controller has a function of detecting a gear stage at a control cycle (current gear stage) and a function of determining whether the detected gear stage is correct or not.

2 Claims, 5 Drawing Sheets

(51) Int. Cl.
  *F16H 61/18* (2006.01)
  *B60K 23/00* (2006.01)
  *F16H 61/12* (2010.01)
  *B60W 30/188* (2012.01)

(52) U.S. Cl.
  CPC ..... *F16H 61/12* (2013.01); *B60W 2510/1005* (2013.01); *B60W 2540/14* (2013.01); *B60W 2540/16* (2013.01); *B60Y 2400/71* (2013.01); *B60Y 2400/90* (2013.01); *B60Y 2400/92* (2013.01)

(56) References Cited

U.S. PATENT DOCUMENTS

2009/0216413 A1* 8/2009 Baldet .................. B60W 30/19
 701/54
2012/0253618 A1 10/2012 Takada et al.

FOREIGN PATENT DOCUMENTS

| JP | 07-042820 A | 2/1995 |
|---|---|---|
| JP | 07-022167 U | 4/1995 |
| JP | 08-061479 A | 3/1996 |
| JP | 2000-088012 A | 3/2000 |
| JP | 2001-248720 A | 9/2001 |
| JP | 2001-280472 A | 10/2001 |
| JP | 2005-351326 A | 12/2005 |
| JP | 2009-248810 A | 10/2009 |
| JP | 2012-211634 A | 11/2012 |

OTHER PUBLICATIONS

Chinese Office Action dated Nov. 1, 2016, which issued in Chinese Application No. 201380066427.5, together with an English language translation thereof.
International Preliminary Report on Patentability dated Jul. 2, 2015, which issued in PCT/JP2013/081613; and English language translation thereof.
Chinese Office Action dated Jun. 30, 2017, which issued in Chinese Application No. 201380066427.5, together with an English language translation thereof.
Extended European Search Report from European Patent Application No. 13866389.3, dated May 4, 2017.

\* cited by examiner

FIG. 4

| | Gear ratio | Main Gear ratio | Spliter switch | Range switch |
|---|---|---|---|---|
| RL | 9.16 | 2.56 | Low | Low |
| RH | 7.43 | 2.56 | High | Low |
| 1st | 10.28 | 2.86 | Low | Low |
| 2nd | 8.34 | 2.86 | High | Low |
| 3rd | 6.30 | 1.76 | Low | Low |
| 4th | 5.11 | 1.76 | High | Low |
| 5th | 3.85 | 2.86 | Low | High |
| 6th | 2.96 | 2.86 | High | High |
| 7th | 2.24 | 1.76 | Low | High |
| 8th | 1.81 | 1.76 | High | High |
| 9th | 1.46 | 1.15 | Low | High |
| 10th | 1.19 | 1.15 | High | High |
| 11th | 1.00 | 0.79 | Low | High |
| 12th | 0.81 | 0.79 | High | High |

Spliter Low ratio : Spliter High ratio = 1.26 : 1.03
Range Low ratio : Range High ratio = 2.81 : 1.00

VEHICULAR SHIFT OPERATION APPARATUS

CROSS-REFERENCE TO RELATED APPLICATION

This application is a continuation application of PCT/JP2013/081613, filed on Nov. 25, 2013, which is hereby incorporated by reference in its entirety for all purposes.

BACKGROUND OF THE INVENTION

1. Field of the Invention

The present invention relates to shift operation of a vehicle having a manual transmission including an input-side sub-transmission (splitter) and an output-side sub-transmission (range).

2. Description of Related Art

Some heave trucks include a main transmission provided with a sub-transmission for switching between high and low, and such a sub-transmission includes a splitter on the input side and a range on the output side.

A manual transmission for heavy trucks and the like of a type provided with a splitter and a range is operated with a shift lever and a switch for gear-shifting, and so such an operation for gear-shifting is very complicated as compared with so-called "passenger cars".

For instance, if a driver erroneously performs operation (erroneous shift operation) to shift to a gear stage on a lower-speed side in spite of the intention to shift to gear on a higher-speed side (e.g., shift to first in spite of the intention of shifting from third to fourth), the rotation speed becomes too high (over-rotation, overrun), and in the worst scenario, the engine or drive-system components may be broken.

On the other hand, if a driver erroneously performs operation to shift to a gear stage on a higher-speed side in spite of the intention to shift to gear on a lower-speed side (e.g., shift to sixth in spite of the intention of shifting from fourth to third), the rotation speed becomes too low (underrun) and falls below the idle rotation speed, and engine stall may happen.

Other conventional techniques include a technique for detecting all gear stages with the gear position switches to prevent over-rotation (e.g., see Japanese Patent Application Laid-open Publication No. 2001-248720). Such a technique, however, is targeted to a vehicle equipped with an automatic transmission, and cannot be used for a vehicle equipped with a manual transmission.

SUMMARY OF THE INVENTION

The present invention is proposed in view of the problems of conventional techniques, and aims to provide a vehicular shift operation apparatus including a manual transmission including an input-side sub-transmission (splitter) and an output-side sub-transmission (range), capable of preventing overrun or underrun due to erroneous shift operation.

A vehicular shift operation apparatus according to the present invention includes a manual transmission (transmission 1) including an input-side sub-transmission (splitter 2) and an output-side sub-transmission (range 3), and the vehicular shift operation apparatus includes: a main shaft rotation speed sensor (5) that measures a main shaft rotation speed, a sensor (81, 82) that detects a position of a clutch pedal, and a controller (10). The controller (10) has a function of detecting a gear stage at a control cycle (current gear stage) and a function of determining whether the detected gear stage is correct or not.

In the present invention, the sensor (81, 82) that detects a position of the clutch pedal preferably includes a first sensor (the switch 81 that is always ON, and turns OFF when the clutch pedal is stepped on) that determines whether the clutch pedal is in an initial-pedaling state or not, and a second sensor (the switch 82 that is always OFF and turns ON when the clutch pedal is stepped down to the deepest part) that determines whether the clutch pedal is stepped down to the deepest part or not.

Alternatively, the sensor that detects a position of the clutch pedal preferably is a clutch stroke sensor that measures the amount of moving of the clutch pedal.

Preferably, according to the present invention, the vehicular shift operation apparatus further includes: an output-side sub-transmission rotation speed measurement device (range rotation speed sensor 7) that measures a rotation speed of the output-side sub-transmission (range 3); and an input-side sub-transmission position detection device (splitter position sensor 6) that detects a position of the input-side sub-transmission (splitter 2), and the controller (10) has the following functions of:

for detection of the gear stage at the control cycle (current gear stage), determining whether the clutch (9) is in a completely disengaged state, is in a completely engaged state, or is in a state of not completely disengaged and not completely engaged (so-called in the "half-clutch" state), based on output from the sensor (81, 82) that detects a position of the clutch pedal;

when the clutch (9) is in the completely disengaged state or in the completely engaged state, determining a gear ratio at the control cycle based on an output-side sub-transmission rotation speed measured by the output-side sub-transmission rotation speed measurement device (7), a main shaft rotation speed measured by the main shaft rotation speed sensor (5) and an input-side sub-transmission position measured by the input-side sub-transmission position detection device (6);

when the clutch (9) is in the state of not completely disengaged and not completely engaged (so-called in the "half-clutch" state), determining a gear ratio at the control cycle (current gear ratio) based on an average (e.g., as moving average) of output-side sub-transmission rotation speeds measured by the output-side sub-transmission rotation speed measurement device (7), an average of main shaft rotation speeds measured by the main shaft rotation speed sensor (5), and an average of input-side sub-transmission positions measured by the input-side sub-transmission position detection device (6); and determining, based on a predetermined relationship between a gear ratio and a gear stage, the gear stage at the control cycle (current gear stage) based on the gear ratio at the control cycle (current gear ratio).

Furthermore, according to the present invention, in the vehicular shift operation apparatus, preferably, the controller (10) further has a function of, in a case in which the clutch (9) is disengaged and a gear is shifted, when either the main shaft rotation speed measured by the main shaft rotation speed sensor (5) or the output-side sub-transmission rotation speed measured by the output-side sub-transmission rotation speed measurement device (7) is greater than a threshold (threshold (high)) for over-rotation (so-called "overrun"), or when either the main shaft rotation speed measured by the main shaft rotation speed sensor (5) or the output-side sub-transmission rotation speed measured by the output-side sub-transmission rotation speed measurement device (7) is less than a threshold (threshold (low)) for low rotation (so-called "underrun"), then determining that the shift operation is erroneous, and activating a warning device (e.g., an erroneous shift operation warning buzzer 12) at a stage prior to engagement of the clutch (9).

The present invention is thus configured, so that the controller (10) detects a gear stage at a control cycle (current gear stage) and determines whether the detected gear stage is correct or not, and so over-rotation (so-called "overrun") or low-rotation (so-called "underrun") due to erroneous shift operation can be prevented with a manual transmission as well similarly to an automatic transmission, and so breakage of the engine or drive-system components due to over-rotation, or engine stall due to low rotation can be prevented.

In other words, the present invention, which is not provided with an automatic transmission, can detect a gear stage at a control cycle (current gear stage) and determine the shift operation as an erroneous operation when the gear stage detected is not correct, and then can issue warning to the driver using a warning device such as the buzzer (12) at a stage prior to engagement of the clutch (9).

Then, the driver receiving the warning of the erroneous shift operation can avoid the engagement of the clutch in such a state of incorrect gear stage, and so breakage of the engine or drive-system components due to over-rotation, or engine stall due to low rotation can be prevented.

BRIEF DESCRIPTION OF THE DRAWINGS

FIG. 4 illustrates an exemplary table to determine the gear stage at the control cycle (current gear stage).

DESCRIPTION ON PREFERRED
EMBODIMENTS

The following describes an embodiment of the present invention, with reference to the accompanying drawings.

Figure 1:
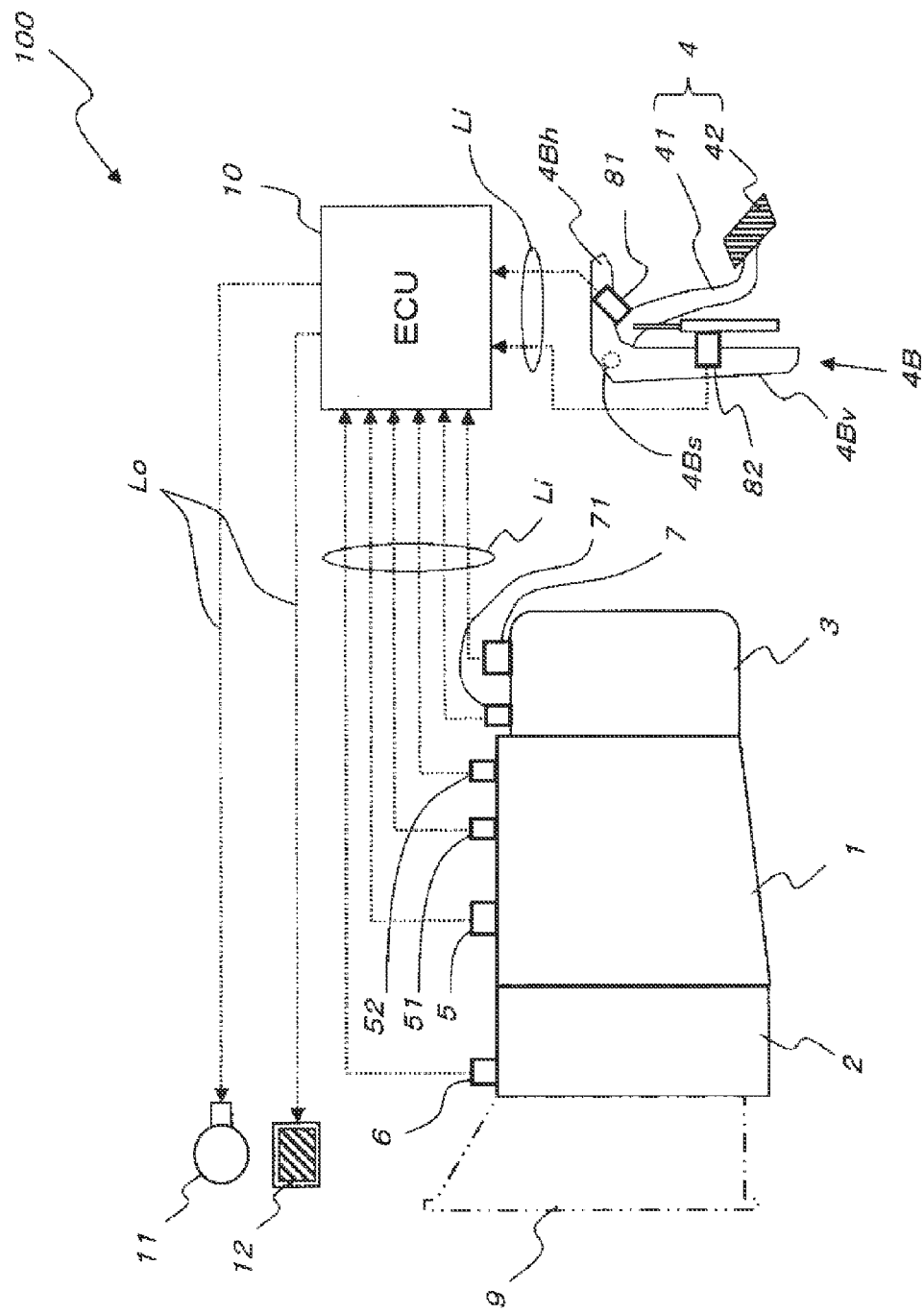
FIG. 1 is a block diagram illustrating an embodiment of the present invention.

In FIG. 1, a shift operation apparatus of a vehicle denoted with numeral 100 as a whole includes a main transmission (transmission) 1, an input-side sub-transmission (splitter) 2, an output-side sub-transmission (range) 3, a clutch pedal 4, a clutch 9 and a control unit 10 as control means.

The transmission 1 includes a main shaft rotation speed sensor 5, a neutral position sensor 51, and a reverse position sensor 52. All of the main shaft rotation speed sensor 5, the neutral position sensor 51 and the reverse position sensor 52 are connected to the control unit 10 via their output signal lines Li.

The splitter 2 includes a splitter position sensor 6, and the range 3 includes a range rotation speed sensor 7 and a range position sensor 71. All of the splitter position sensor 6, the range rotation speed sensor 7 and the range position sensor 71 are connected to the control unit 10 via their output signal lines Li.

The clutch pedal 4 includes a pedal lever 41 and a pedal main body 42, and the pedal main body 42 is fixedly provided at the forward end of the pedal lever 41.

An end part of the pedal lever 41 on the side distant from the pedal main body 42, is pivotally and swingably supported around a rotary shaft 4Bs. This rotary shaft 4Bs is provided at a clutch pedal bracket 4B disposed in the vicinity of the floor in front of the driver's sheet (not illustrated).

The clutch pedal bracket 4B has a horizontal section 4Bh and a vertical section 4Bv, and has a shape like a reversed L.

The horizontal section 4Bh of the clutch pedal bracket 4B is fixedly provided with a first clutch pedal position sensor 81. The vertical section 4Bv is fixedly provided with a second clutch pedal position sensor 82.

The first clutch pedal position sensor 81 is a sensor to detect whether the clutch pedal 4 is in an initial-pedaling state or not (whether the pedal is stepped on or not), which is always ON and turns OFF when the clutch pedal 4 is stepped on.

The second clutch pedal position sensor 82 is a sensor that detects whether the clutch pedal 4 is stepped down to the deepest part or not. When the clutch pedal 4 is stepped down to the deepest, then the second clutch pedal position sensor 82 turns ON and outputs such information.

Both of the first clutch pedal position sensor 81 and the second clutch pedal position sensor 82 are connected to the control unit 10 via their output signal lines Li.

The shift operation apparatus 100 of the vehicle is provided with a splitter position lamp 11 and a warning buzzer (erroneous shift operation warning buzzer) 12 in a meter panel (not illustrated).

Both of the splitter position lamp 11 and the warning buzzer 12 are connected to the control unit 10 via their control signal lines Lo.

Although not illustrated, another warning means (e.g., a light-emission device for warning) may be provided instead of the warning buzzer 12 or in addition to the warning buzzer 12.

The control unit 10 has a function of detecting a gear stage at each control cycle (current gear stage, or current shift position), and a function of determining whether the detected gear stage is correct or not.

The control unit 10 has a function of, for the detection of a gear stage (shift position) at each control cycle, determining whether the clutch 9 is in a completely disengaged state, the clutch 9 is in a completely engaged state, or the clutch is in a state of not completely disengaged and not completely engaged (so-called a "half-clutch" state), based on output from the sensor (81, 82) that detects a position of the clutch pedal 4.

The control unit 10 further has a function of, when the clutch 9 is in the state of completely disengaged, determining the gear ratio at the control cycle based on the range rotation speed measured by the range rotation speed sensor 7, the main shaft rotation speed measured by the main shaft rotation speed sensor 5 and the splitter position measured by the splitter position sensor 6.

The control unit 10 still further has a function of, when the clutch 9 is in the state of not completely disengaged and not completely engaged (so-called a "half-clutch" state), determining the gear ratio at the control cycle (current gear ratio) based on the average (e.g., as moving average) of the range rotation speeds measured by the range rotation speed sensor 7, the average of the main shaft rotation speeds measured by the main shaft rotation speed sensor 5 and the average of the splitter positions measured by the splitter position sensor 6.

The control unit 10 further has a function of determining, based on a predetermined relationship between the gear ratio and the gear stage, the gear stage at the control cycle (current gear stage) based on the gear ratio at the control cycle (current gear ratio).

The control unit 10 additionally has a function of, in a case in which the clutch 9 is disengaged and the gear is shifted, when either the main shaft rotation speed measured by the main shaft rotation speed sensor 5 or the range rotation speed measured by the range rotation speed sensor 7 is greater than a threshold (threshold (high)) for over-rotation (so-called "overrun"), or when either the main shaft rotation speed measured by the main shaft rotation speed sensor 5 or the range rotation speed measured by the range rotation speed sensor 7 is less than a threshold (threshold (low)) for low rotation (so-called "underrun"), then determining that the shift operation is erroneous, and activating a warning device (e.g., the erroneous shift operation warning buzzer 12) at a stage prior to the engagement of the clutch 9.

Next, referring to the flowchart of FIG. 2 as well as FIG. 1, the following describes the control for detecting the current gear stage (gear stage at the time of the control cycle, hereinafter called "shift position") at each control cycle.

Figure 2:
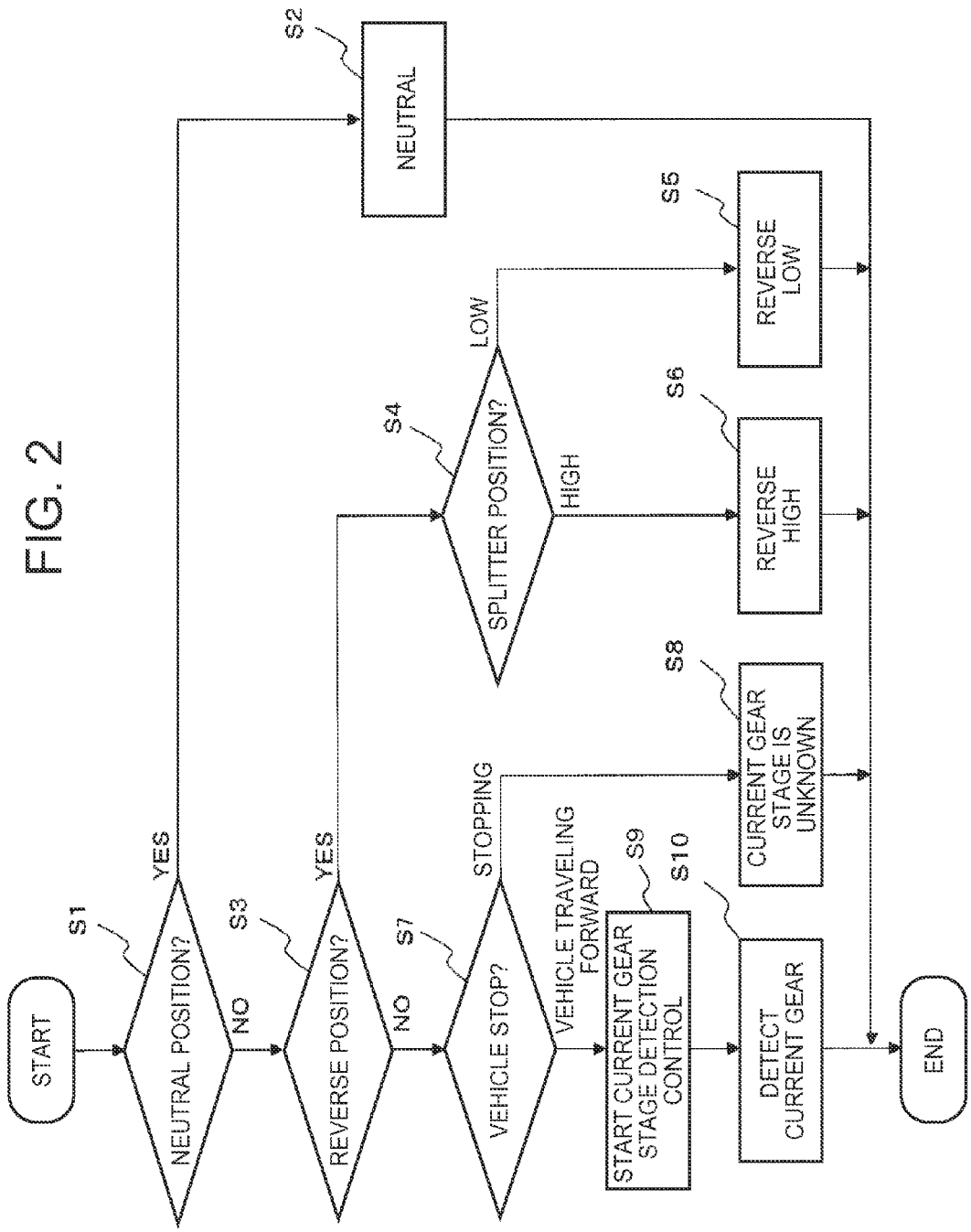
FIG. 2 is a flowchart illustrating the control to detect a gear stage at a control cycle (current gear stage) in the embodiment.

At Step S1 of FIG. 2, the control unit 10 determines whether the current (at the control cycle) state is neutral or not based on output information from the neutral position sensor 51 provided at the transmission 1.

When the current state is neutral (YES at Step S1), the procedure proceeds to Step S2, and when the current state is not neutral (NO at Step S1), the procedure proceeds to Step S3.

At Step S2, it is determined that the shift position at the control cycle is "neutral", and then the control cycle ends.

At Step S3 (when the shift position at the control cycle is not neutral), the control unit 10 determines whether the current state is reverse (backward) or not based on output information from the reverse position sensor 52 provided at the transmission 1.

When the current state is reverse (backward) (YES at Step S3), the procedure proceeds to Step S4, and when the current state is not reverse (backward) (NO at Step S3), the procedure proceeds to Step S7.

At Step S4 (when the shift position at the control cycle is reverse), the control unit 10 determines whether the splitter 2 is "Low" or "High" currently (at the control cycle) based on output information from the splitter position sensor 6 provided at the splitter 2 serving as a sub-transmission.

When the splitter 2 is "Low", the procedure proceeds to Step S5, in which it is determined that the reverse is "Low" at the control cycle, and the control cycle ends.

When the splitter 2 is "High", the procedure proceeds to Step S6, in which it is determined that the reverse is "High" at the control cycle, and the control cycle ends.

At Step S7 (when the shift position at the control cycle is not reverse), the control unit 10 determines whether the vehicle stops or travels forward based on output information from the range rotation speed sensor 7, for example. When the vehicle stops (at Step S7, "stop"), then the procedure proceeds to Step S8, in which it is determined that the shift position is unknown, and the control cycle ends.

On the other hand, when the vehicle travels forward (at Step S7, "vehicle traveling forward"), the procedure proceeds to Step S9, in which the current (at the control cycle) shift position detection control starts.

After Step S9, the procedure proceeds to Step S10, in which the current shift position is determined (current gear stage detection control), and the control cycle ends.

The flowchart in FIG. 2 illustrates the basic control until the shift position is detected.

Figure 3:
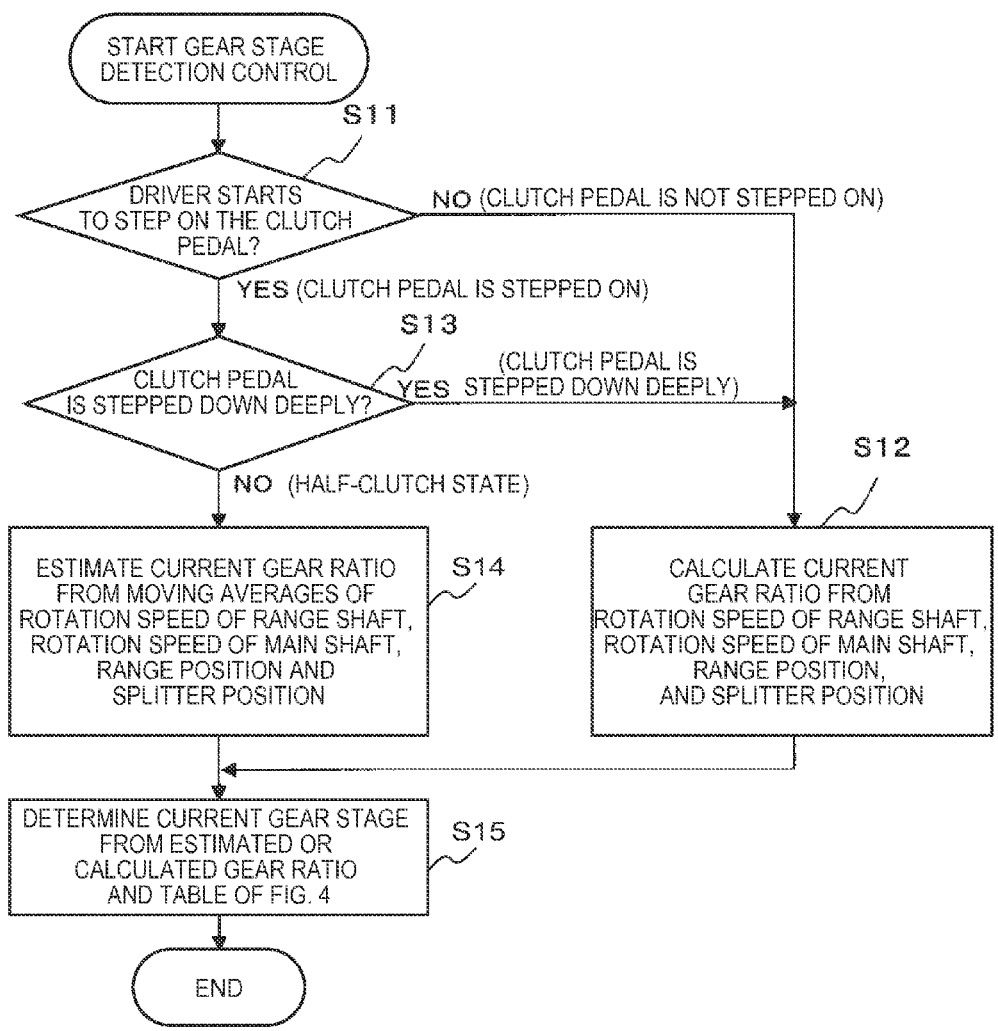
FIG. 3 is a flowchart illustrating the current gear stage detection control in FIG. 2 in details.

Meanwhile the flowchart of FIG. 3 illustrates the shift position detection control (current gear stage detection control) at Steps S9 and S10 in details.

In the gear stage detection control (shift position detection control) of FIG. 3, at Step S11, the control unit 10 determines whether the driver starts to step on the clutch pedal 4 or not based on the output information from the first clutch pedal position sensor 81. When the clutch pedal 4 is not stepped on ("No (the clutch pedal is not stepped on)" at Step S11), the procedure proceeds to Step S12. When the clutch pedal 4 is stepped on ("Yes (the clutch pedal is stepped on)" at Step S11), the procedure proceeds to Step S13.

At Step S12 ("No (the clutch pedal is not stepped on)" at Step S11), the control unit 10 calculates the current gear ratio based on a range rotation speed signal from the range speed sensor 7, a rotation speed signal of the main shaft from the main shaft rotation speed sensor 5, range position information from the range position sensor 71, and splitter position information from the splitter position sensor 6. Then the procedure proceeds to Step S15.

For the calculation, a function (computational expression) including the above-mentioned information as a parameter may be used. Alternatively, a characteristic diagram or a dedicated table may be used.

As an exemplary expression to calculate the gear ratio, there is an expression of, for example, "gear ratio=gear ratio calculated from the splitter position×main shaft rotation speed×range rotation speed×gear ratio calculated from range position".

For the calculation of the current gear ratio at Step S12, the range position information from the range position sensor 71 may be omitted.

At Step S13 ("Yes (the clutch pedal is stepped on)" at Step S11), the control unit 10 determines whether the clutch pedal 4 is stepped down deeply (Yes) or is in a half-clutch state (No) based on output information from the second clutch pedal position sensor 82.

Step S13 is a logical circuit for the case in which the clutch pedal 4 is stepped on at Step S11, meaning that, if no information is output from the second clutch pedal position sensor 82 and the clutch pedal 4 is not stepped down deeply, then it is determined at this control cycle that the clutch pedal 4 is "in the state in which it is stepped on but is not stepped down deeply", i.e., "in the half-clutch state".

At Step S13, if the clutch pedal 4 is stepped down deeply (Yes at Step S13), then the procedure proceeds to Step S12.

On the other hand, if it is in the haft-clutch state (No at Step S13, or no information is output from the second clutch pedal position sensor 82), then the procedure proceeds to Step S14.

At Step S14, the control unit 10 estimates the current gear ratio based on the moving average of information from each sensor (a range rotation speed signal from the range rotation speed sensor 7, a main shaft rotation speed signal from the main shaft rotation speed sensor 5, range position information from the range position sensor 71, and splitter position information from the splitter position sensor 6), and then the procedure proceeds to Step S15.

Herein, the moving average is one example as a scheme to find the average of a parameter that varies greatly, and it is not necessarily limited to the moving average. As long as any scheme to find the average of a parameter that varies greatly, it can be used appropriately, which is not limited to the moving average.

For the calculation of the current gear ratio at Step S14 as well, the range position information from the range position sensor 71 may be omitted.

At Step S15, the control unit 10 determines the current shift position (current gear stage) using the gear ratio calculated at Step S12 or the gear ratio estimated at Step S14, and the table of FIG. 4. Then the control cycle ends.

Herein the table of FIG. 4 illustrates one exemplary relationship among various shift positions, their corresponding total ratios (current gear ratio) ("Gear ratio" in FIG. 4), main gear ratios, splitter positions (High or Low) detected by the splitter position sensor 6, and range positions (High or Low) detected by the range position sensor 71.

Alternatively, the current shift position (current gear stage) can be found from the gear ratio calculated at Step S12 and the gear ratio estimated at Step S14 using an expression for calculation, for example, instead of using the table of FIG. 4.

Figure 5:
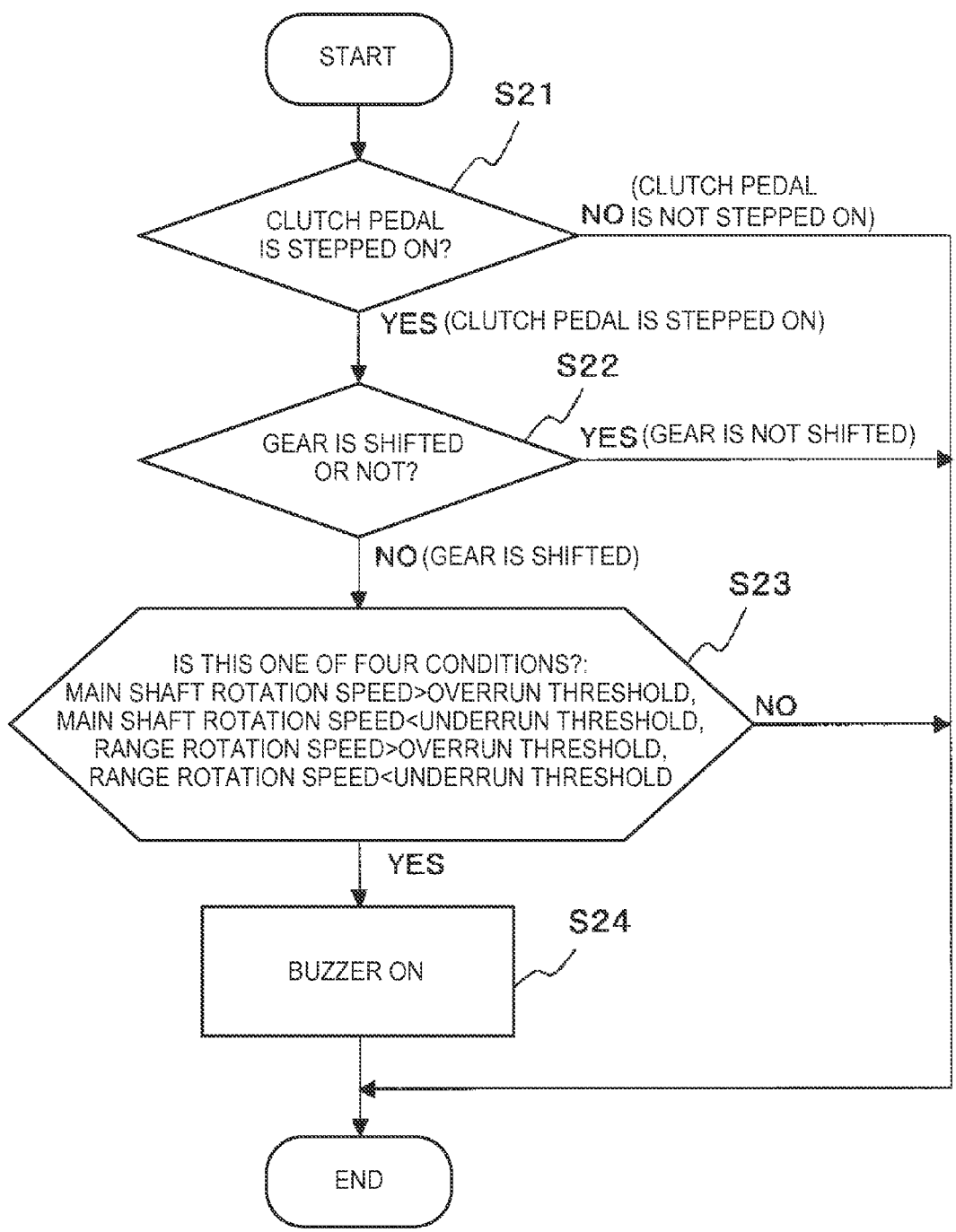
FIG. 5 is a flowchart illustrating the control to determine an erroneous shift operation in the embodiment.

FIG. 5 illustrates the control for determining whether erroneous shift operation is performed or not (control to determine erroneous shift operation, or control to determine erroneous transmission operation).

Erroneous shift operation refers to the operation such that engagement of the clutch following the shift operation increases the rotation speed too high (over-rotation, overrun) or engagement of the clutch following the shift operation decreases the rotation speed too low (underrun).

At Step S21 of FIG. 5, the control unit 10 determines whether the clutch pedal is stepped on or not (whether the clutch level is at an initial-pedaling position or not) based on output information from the first clutch pedal position sensor 81.

If the clutch pedal is not stepped on (No at Step S21, the first clutch pedal position sensor 81 is ON, or "the clutch is not stepped on" at Step S21), erroneous operation of the shift also is not performed, and so the control cycle ends.

If the clutch pedal is stepped on (Yes at Step S21, the first clutch pedal position sensor 81 is OFF, or "the clutch pedal is stepped on" at Step S21), then the procedure proceeds to Step S22, in which determination is made whether the shift operation is performed or not (described as "gear is shifted or not" in the symbol of Step S22 in FIG. 5).

At Step S22, determination is made whether the shift position at the control cycle is the same as the shift position at the previous control cycle or is different from that. If the shift position at the control cycle is the same as the shift position at the previous control cycle, it is determined that shift operation is not performed (gear is not shifted). On the other hand, if the shift position at the control cycle is different from the shift position at the previous control cycle, it is determined that shift operation is performed (gear is shifted).

When gear is not shifted at Step S22 (YES at Step S22), this means that erroneous shift operation also is not performed, and so the control cycle ends. On the other hand, if the gear is shifted at Step S22 (NO at Step S22), the procedure proceeds to Step S23.

Herein in the case of "NO (gear is shifted)" at Step S22, the clutch is completely disengaged. This is because the gear cannot be shifted unless the clutch is completely disengaged. That is, "NO" at Step S22 means that the clutch is in the completely disengaged state.

At Step S23, determination is made whether either the main shaft rotation speed or the range rotation speed is greater than a threshold (high threshold) for over-rotation (so-called "overrun"), or either the main shaft rotation speed or the range rotation speed is less than a threshold (low threshold) for low-rotation (so-called "underrun").

Specifically at Step S23, determination is made which one of the following is the case this time:

(A) the main shaft rotation speed is greater than the threshold for overrun (high threshold for the main shaft rotation speed);

(B) the main shaft rotation speed is less than the threshold for underrun (low threshold for the main shaft rotation speed);

(C) the range rotation speed is greater than the threshold for overrun (high threshold for the range rotation speed); and (D) the range rotation speed is less than the threshold for underrun (low threshold for the range rotation speed).

As stated above, the main shaft rotation speed is measured by the main shaft rotation speed sensor 5, and the range rotation speed is measured by the range rotation speed sensor 7.

Herein the "threshold for overrun" and the "threshold for underrun" are preset individually depending on the specifications of the shift operation apparatus 100 or the like.

When this is the case of (A) or (C), then it is determined that the main shaft rotation speed or the range rotation speed is too high, and so over-rotation (overrun) may occur. That is, it is in a lower gear stage than the correct gear stage, and so if the clutch is engaged in this state, the engine or drive-system components may be broken due to over-rotation.

When this is in the case of (B) or (D), then it is determined that the main shaft rotation speed or the range rotation speed is too low, and so low-rotation (underrun) may occur. That is, it is in a higher shift position (gear stage) than the correct shift position (gear stage), and so if the clutch is engaged in this state, engine stall may occur.

That is, if this is the case of any one of (A) to (D) (YES at Step S23), it is determined that the shift position (current gear stage) is not correct and it is erroneous shift operation, and then the procedure proceeds to Step S24.

On the other hand, when this is not the case of (A) to (D) (NO at Step S23), it is determined that the shift position (current gear stage) is correct, and then the control cycle ends.

At Step S24, warning is issued to the driver using, for example, the buzzer 12 (erroneous shift operation warning buzzer, see FIG. 1), indicating that erroneous operation occurred for the shift change and the shift position (current gear stage) is not correct.

As stated above, in the case of "NO" at Step S22, the clutch 9 is completely disengaged, and at the stage of Step S24, the clutch 9 is not engaged.

When warning is issued to the driver at the stage of Step S24, then the driver knows that "erroneous operation occurred for the shift change and the shift position (current gear stage) is not correct", and so the driver does not engage the clutch 9 and can perform necessary operation (e.g., perform shift-changing again).

In this way, if this is the case of any one of (A) to (D), the driver can perform necessary countermeasure at the stage prior to the engagement of the clutch 9, which can prevent breakage of the engine and the drive-system components, or can prevent engine stall.

After warning is issued to the driver at the stage of Step S24, the control cycle ends.

The embodiments in the drawings are just illustrative, which are not for limiting the technical scope of the present invention.

It should be noted that the entire contents of Japanese Patent Application No. 2012-276579, filed on Dec. 19, 2012, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A vehicular shift operation apparatus including a manual transmission including an input-side sub-transmission and an output-side sub-transmission, comprising:
    a main shaft rotation speed sensor that is configured to measure a main shaft rotation speed;
    a sensor that is configured to detect a position of a clutch pedal;
    a controller, wherein the controller has a function of detecting a gear stage at a control cycle and a function of determining whether the detected gear stage is correct or not;
    an output-side sub-transmission rotation speed meter that is configured to measure a rotation speed of the output-side sub-transmission; and
    an input-side sub-transmission position detector that is configured to detect a position of the input-side sub-transmission,
    wherein the controller has the following functions of:
        for detection of the gear stage at the control cycle, determining whether a clutch is in a completely disengaged state, is in a completely engaged state, or is in a state of not completely disengaged and not completely engaged, based on output from the sensor that is configured to detect a position of the clutch pedal;
        when the clutch is in the completely disengaged state or in the completely engaged state, determining a gear ratio at the control cycle based on an output-side sub-transmission rotation speed measured by the output-side sub-transmission rotation speed meter, a main shaft rotation speed measured by the main shaft rotation speed sensor and an input-side sub-transmission position measured by the input-side sub-transmission position detector;
        when the clutch is in the state of not completely disengaged and not completely engaged, determining a gear ratio at the control cycle based on an average of output-side sub-transmission rotation speeds measured by the output-side sub-transmission rotation speed meter, an average of main shaft rotation speeds measured by the main shaft rotation speed sensor, and an average of input-side sub-transmission positions measured by the input-side sub-transmission position detector; and
        determining, based on a predetermined relationship between a gear ratio and a gear stage, the gear stage at the control cycle based on the gear ratio at the control cycle.

2. The vehicular shift operation apparatus according to claim 1, wherein
    the controller has a function of, in a case in which the clutch is disengaged and a gear is shifted, when either the main shaft rotation speed measured by the main shaft rotation speed sensor or the output-side sub-transmission rotation speed measured by the output-side sub-transmission rotation speed meter is greater than a threshold for over-rotation, or when either the main shaft rotation speed measured by the main shaft rotation speed sensor or the output-side sub-transmission rotation speed measured by the output-side sub-transmission rotation speed meter is less than a threshold for low rotation, then determining that the shift operation is erroneous, and activating a warning device at a stage prior to engagement of the clutch.

* * * * *